United States Patent Office 3,383,423
Patented May 14, 1968

3,383,423
METHOXYALKYLADAMANTANES
Robert E. Moore, Wilmington, Del., assignor to Sun Oil Company, Philadelphia, Pa., a corporation of New Jersey
No Drawing. Filed Apr. 25, 1967, Ser. No. 633,385
5 Claims. (Cl. 260—611)

ABSTRACT OF THE DISCLOSURE

Four new adamantane derivatives are disclosed, viz.; 1-methoxy-3,5-dimethyladamantane; 1-methoxy-3,5,7-trimethyladamantane; 1-methoxy-3-ethyl-5-methyladamantane; and 1 - methoxy - 3-ethyl-5,7-dimethyladamantane. These compounds exhibit antiviral activity against tobacco mosaic virus in plant tests and against herpes simplex and other viruses in virology tests with mice.

Background of the invention

This invention relates to four specific methoxy derivatives of alkyladamantanes, namely, 1-methoxy-3,5-dimethyladamantane; 1-methoxy-3,5,7-trimethyladamantane; 1-methoxy-3-ethyl-5-methyladamantane; and 1-methoxy-3-ethyl-5,7-dimethyladamantane.

The cage-like structure of the adamantane nucleus has been illustrated in several ways, of which the following is one example:

As can be seen, it consists of three condensed cyclohexane rings arranged so that there are four bridgehead carbon atoms which are equivalent to each other.

In the prior art 1-methoxy-3-methyladamantane has been reported by Stetter et al., Angew. Chem., Internat. Edit., the method of preparation being by reaction of methanol with 3,7-dimethylenebicyclo[3,3,1]nonane. No uses for this methoxy derivative was disclosed.

Landsbury and Pattison, J. Org. Chem., 27, 1933–1939 (1962), disclosed the preparation of 1-benzoxyadamantane by a Williamson synthesis involving the reaction of 1-bromoadamantane with sodium benzoxide in benzyl alcohol. Likewise no use for the product was suggested.

Stetter and Mayer, Ber., 95, 667–671 (1962), disclosed the preparation of 3-methoxy-1-carboxyadamantane by refluxing a mixture of 3-bromo-1-carboxyadamantane, silver oxide and methanol. Again no utility for the product was shown.

Summary of the invention

The four methoxyalkyladamantanes of the present invention are non-viscous liquids having a mild camphor-like odor. They can be represented by the following structural formula:

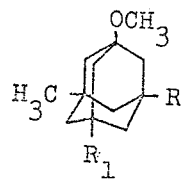

wherein R is hydrogen or methyl and R₁ is methyl or ethyl. These compounds exhibit antiviral activity both in plant tests against tobacco mosaic virus and in tests with mice against herpes simplex virus and other viruses.

Description

The methoxy compounds of the invention can be prepared from the corresponding alkyladamantane hydrocarbons by converting the hydrocarbon to the corresponding bridgehead monohalo derivative and then substituting a methoxy group into the latter in place of the halogen substituent. For example, the bridgehead bromo derivative can be prepared by reacting the alkyladamantane with bromine in the manner described by Koch et al., Ber., 96, 213–219 (1963), for brominating 1,3,5-trimethyladamantane at the unsubstituted bridgehead position to produce 1-bromo-3,5,7-trimethyladamantane. The resulting bromoalkyladamantane can then be reacted with sodium methoxide in methanol solution (Williamson synthesis) to form the corresponding methoxy derivative. Alternatively, the bromoalkyladamantane can be admixed with methanol and silver oxide and the mixture refluxed to yield the desired methoxy derivative. In either of the these preparative procedures the reaction product can be filtered to remove the resulting inorganic salt and worked up in any suitable manner, e.g., by evaporating the methanol and then distilling the product under reduced pressure.

The four methoxyalkyladamantanes of the invention are normally colorless liquids having an odor resembling that of camphor. They are soluble in such solvents as other ethers, acetone, lower alcohols, benzene, toluene, dimethylformamide and the like. As indicated above, they have unexpected antiviral activities both in plant tests and in animal tests. Specifically these compounds have inhibitory effects against tobacco mosaic virus which causes widespread damage to various crops, such as tobacco and tomato plants. In tests with mice the present compounds show effectiveness as an antiviral agent particularly against herpes simplex virus and are capable of exerting inhibitory action against other viruses such as Columbia SK polio and influenza NWS viruses.

The following examples are illustrative:

Example 1.—Preparation of 1-methoxy-3,5-dimethyladamantane

An Erlenmeyer flask equipped with a magnetic stirring bar and reflux condenser was charged with 1.9 g. of 1-bromo-3,5-dimethyladamantane, 1.8 g. of silver oxide and 25 ml. of methanol, and the mixture was heated and refluxed for about 3 hours while being stirred. After cooling the reaction mixture was filtered to remove AgBr, excess methanol was evaporated and the residue was distilled under reduced pressure. The 1-methoxy-3,5-dimethyladamantane was obtained as distillate in a yield of 75–80% based on theory. The product was a non-viscous colorless liquid having the following properties:

B.P. @ 760 mm. Hg abs. _____ ° C.___ 238
R.I. 20/D _____ 1.4820

Example 2.—Preparation of 1-methoxy-3-ethyl-5,7-dimethyladamantane

The same kind of reaction as in Example 1 was carried out in similar fashion using 10.5 g. of 1-bromo-3-ethyl-5,7-dimethyladamantane, 10.0 g. of Ag₂O and 100 ml. of methanol. The resulting 1-methoxy derivative, obtained in approximately the same yield, likewise was a non-viscous colorless liquid and had the following properties:

B.P. @ 760 mm. Hg abs. _____ ° C__ 254
R.I. 20/D _____ 1.4840

Example 3

The substitution of 1-bromo-3,5,7-trimethyladamantane for the 1-bromo starting material in either of the foregoing examples gives approximately the same yield of 1-methoxy-3,5,7-trimethyladamantane having properties closely resembling those of the methoxy products in Examples 1 and 2.

Example 4

Likewise the use of 1-bromo-3-ethyl-5-methyladamantane in place of the 1-bromo compounds in either of Examples 1 and 2 gives 1-methoxy-3-ethyl-5-methyladamantane having analogous properties.

Example 5.—Plant viricide tests

The 1-methoxy-3,5-dimethyladamantane prepared as in Example 1 was tested as a viricide against tobacco mosaic virus using tobacco plants, *nicotiana glutinosa*, grown from seeds under greenhouse conditions and in first true leaf growth stage. The methoxy compound was formulated for application to the plants by dissolving same in acetone and dispersing the mixture in water at a standard concentration. The tobacco plants first were sprayed with a standard amount of the aqueous mixture in a manner effecting complete coverage of the plant surface and were air dried. An inoculum was prepared by extracting tobacco leaves infected with the virus and adding to the extract finely divided Carborundum. The treated dry plants were then inoculated by spraying the extract mixture thereon and rubbing leaf surfaces gently to assure epidermal cell rupture by the Carborundum. A set of control plants was inoculated in the same manner without prior treatment. The plants were thereafter observed for infection by the virus, the severity thereof being determined by actual count of infection loci, and such counts were compared for the treated plants as against the controls. It was found that the methoxy compound provided 54% protection against infection by the tobacco mosaic virus. The other methoxy compounds of the invention when used in this manner give substantially equivalent results.

Example 6.—Comparative virology tests against herpes simplex virus

A series of in vivo virology tests with mice was made to compare the methoxy derivatives of Examples 1 and 2 (herein designated 1-methoxy-DMA and 1-methoxy-EDMA, respectively) with two other adamantane derivatives with respect to antiviral activity against herpes simplex virus. The two other compounds were specifically the hydrochloride salts of 1-aminoadamantane (1-amino-A) and 1-amino-3,5-dimethyladamantane (1-amino-DMA). The 1-amino-A, administered in its hydrochloride salt form, is known to have antiviral effect against some viruses, mainly showing inhibitory activity with respect to type A strains of influenza as can be seen by reference to an article by Wood, Annals New York Academy of Sciences, 130, Art. 1, 419–431, July 30, 1965. In the present work each set of tests involved a comparison between mice treated with the compound in question and inoculated with the virus and a control group of untreated mice similarly inoculated. The quantity of herpes simplex virus used was that amount which would induce 50% mortality in the control animals within 21 days. The virus inoculum was introduced intraperitoneally. In some cases the route of drug administration was oral (PO), in others subcutaneous (SC) and in others intraperitoneal (IP), as indicated in Table I. Results of the tests were rated by means of an alphabetical scale having the following approximate meaning:

A. Good activity, with an increased mean survival time of the treated mice.
B. Less but statistically significant activity.
C. No significant activity.

The results are shown in Table I.

TABLE I

| Treating Agent | Route of Drug Administration | Total Dosage, mg./kg. | Rating |
| --- | --- | --- | --- |
| 1-methoxy-DMA | PO | 0.04 | C |
| Do | PO | 0.4 | A |
| Do | PO | 4.0 | A |
| Do | SC | 0.03 | C |
| Do | SC | 0.3 | A |
| Do | SC | 3.0 | A |
| 1-methoxy-EDMA | PO | 0.04 | A |
| Do | PO | 0.4 | A |
| Do | PO | 4.0 | A |
| Do | PO | [1] 0.04 | A |
| Do | PO | [1] 0.4 | A |
| Do | PO | [1] 4.0 | A |
| Do | SC | 0.3 | C |
| Do | SC | 3.0 | C |
| 1-amino-A | SC | 0.2 | C |
| Do | SC | 0.4 | C |
| Do | SC | 1.2 | C |
| Do | SC | 2.0 | C |
| Do | SC | 4.0 | C |
| Do | IP | 0.2 | C |
| Do | IP | 0.4 | C |
| Do | IP | 0.6 | C |
| Do | IP | 1.2 | C |
| 1-amino-DMA | SC | 0.6 | C |
| Do | SC | 1.2 | C |
| Do | IP | 0.1 | C |
| Do | IP | 0.2 | C |
| Do | IP | 0.4 | C |
| Do | IP | 0.6 | C |
| Do | IP | 1.2 | C |

[1] Rerun.

The results in Table I show that the methoxy compounds of the present invention can inhibit infection in mice by herpes simplex virus. Good activity against this virus is likewise exhibited when 1-methoxy-3,5,7-trimethyladamantane is used in place of the compounds of Examples 1 and 2. In contrast, the 1-amino compounds derived from adamantane and dimethyladamantane exhibited no antiviral activity whatever against herpes simplex in these tests.

Example 7.—Virology tests against other viruses

Sets of runs were made as in the preceding example using 1-methoxy-DMA and 1-methoxy-EDMA for treatment of mice inoculated with Columbia SK polio virus in one series of runs and with influenza NWS virus in another. Results are shown in Table II.

TABLE II

| Treating Agent | Virus Used | Route of Drug Administration | Total Dosage, mg./kg. | Rating |
| --- | --- | --- | --- | --- |
| 1-methoxy-DMA | Columbia SK polio. | SC | 0.3 | C |
| Do | do | SC | 3.0 | A |
| Do | Influenza NWS | SC | 0.3 | A |
| Do | do | SC | 3.0 | C |
| 1-methoxy-EDMA | Columbia SK polio. | SC | 0.3 | C |
| Do | do | SC | 3.0 | C |
| Do | Influenza NWS | SC | 0.3 | A |
| Do | do | SC | 3.0 | A |

The results of the foregoing tests indicate that methoxy compounds of the present invention not only have antiviral activity against herpes simplex virus but also can show antiviral effects against other types of viruses in animal tests.

I claim:
1. A methoxyalkyladamantane having the formula

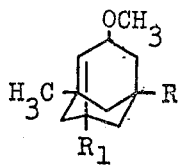

wherein R is hydrogen or methyl and $R_1$ is methyl or ethyl.

2. The compound of claim 1 which is 1-methoxy-3,5-dimethyladamantane.
3. The compound of claim 1 which is 1-methoxy-3,5,7-trimethyladamantane.
4. The compound of claim 1 which is 1-methoxy-3-ethyl-5-methyladamantane.
5. The compound of claim 1 which is 1-methoxy-3-ethyl-5,7-dimethyladamantane.

References Cited

Stetter et al.: Angew. Chem., vol. 77 (4) (1965), page 171.

BERNARD HELFIN, *Primary Examiner.*